(12) United States Patent  
Moon et al.

(10) Patent No.: US 8,315,330 B2  
(45) Date of Patent: Nov. 20, 2012

(54) METHOD OF TRANSMITTING DATA IN WIRELESS COMMUNICATION SYSTEM

(75) Inventors: Seong Ho Moon, Gyeonggi-do (KR); Min Seok Noh, Gyeonggi-do (KR); Yeong Hyeon Kwon, Gyeonggi-do (KR); Jin Sam Kwak, Gyeonggi-do (KR); Dong Cheol Kim, Gyeonggi-do (KR); Seung Hee Han, Gyeonggi-do (KR); Hyun Woo Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 12/340,367

(22) Filed: Dec. 19, 2008

(65) Prior Publication Data

US 2009/0175372 A1 Jul. 9, 2009

Related U.S. Application Data

(60) Provisional application No. 60/015,640, filed on Dec. 20, 2007, provisional application No. 60/021,039, filed on Jan. 15, 2008.

(30) Foreign Application Priority Data

Apr. 22, 2008 (KR) ........................ 10-2008-0037296

(51) Int. Cl.  
*H04L 27/00* (2006.01)

(52) U.S. Cl. ........ 375/295; 375/260; 375/296; 370/328; 370/208

(58) Field of Classification Search ................... 375/260  
See application file for complete search history.

(56) References Cited

U.S. PATENT DOCUMENTS

| 5,274,311 | A   | * | 12/1993 | Littlejohn et al. | 318/562 |
|-----------|-----|---|---------|------------------|---------|
| 7,215,715 | B2  | * | 5/2007  | Chini et al.     | 375/296 |
| 7,715,842 | B2  | * | 5/2010  | Kim et al.       | 455/436 |
| 7,848,295 | B2  | * | 12/2010 | Kang et al.      | 370/332 |
| 7,925,267 | B2  | * | 4/2011  | Jung et al.      | 455/450 |
| 2005/0213556 | A1 | * | 9/2005 | Wax et al.       | 370/349 |
| 2007/0058595 | A1 |   | 3/2007  | Classon et al.   |         |
| 2007/0097905 | A1 | * | 5/2007  | Suh et al.       | 370/328 |
| 2007/0286066 | A1 |   | 12/2007 | Zhang et al.     |         |
| 2008/0095195 | A1 | * | 4/2008  | Ahmadi et al.    | 370/478 |
| 2008/0107073 | A1 | * | 5/2008  | Hart et al.      | 370/330 |
| 2009/0016371 | A1 | * | 1/2009  | Zheng et al.     | 370/431 |

OTHER PUBLICATIONS

T.Kim et. a. "A TDD-OFDMA Framework for Next Generation Mobile Communication", IEEE 64th Vehicular Technology Conference, Sep. 25-28, 2006, pp. 1-5.

S.Shin et. al. "The Performance Comparison between WiBro and HSDPA", 2nd International Symposium on Wireless Communication Systems, Sep. 7, 2005, pp. 346-350.

* cited by examiner

*Primary Examiner* — Lihong Yu  
(74) *Attorney, Agent, or Firm* — Lee, Hong, Degerman, Kang & Waimey

(57) ABSTRACT

A method of transmitting data in a wireless communication system, includes: transmitting first data via a first frame for a first wireless communication system; transmitting second data via a second frame for a second wireless communication system supporting backward compatibility with respect to the first wireless communication system; and transmitting control information with respect to the first and second frames, wherein the control information includes a frame control header (FCH) which indicates information about the second frame by using a reserved bit region of the first frame.

7 Claims, 17 Drawing Sheets

METHOD OF TRANSMITTING DATA IN WIRELESS COMMUNICATION SYSTEM

CROSS-REFERENCE TO RELATED APPLICATIONS

Pursuant to 35 U.S.C. §119, this application claims the benefit of earlier filing date and right of priority to Korean Patent Application No. 10-2008-0037296, filed on Apr. 22, 2008, and also claims the benefit of U.S. Provisional Application Nos. 61/021,039, filed on Jan. 15, 2008, and 61/015,640, filed on Dec. 20, 2007, the contents of which are all incorporated by reference herein in their entirety.

FIELD OF THE INVENTION

The present invention relates to wireless communications and, more particularly, to a method for transmitting data by using duplex frames to which two systems are applied.

DESCRIPTION OF THE RELATED ART

IEEE (Institute of Electrical and Electronics Engineers) 802.16 standards provide techniques and protocols to support a broadband wireless access. Standardization proceeded starting from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to the physical layer in IEEE 802.16a standards approved in 2003. After the IEEE 802.16a standards were completed, revised IEEE 802.16-2004 standards were approved in 2004. IEEE 802.16-2004/Cor1 (referred to as 'IEEE 802.16e', hereinafter) was completed in the form of 'corrigendum' in 2005 in order to resolve and correct bugs and errors of the IEEE 802.16-2004 standards.

Standardization of IEEE 802.16m, new technology standards, is under way based on the IEEE 802.16e. The newly developed technology standards IEEE 802.16m are expected to be designed to also support the previously designed IEEE 802.16e. Namely, the technology (IEEE 802.16m) of the newly designed system should be configured to operate by effectively involving the legacy technology (IEEE 802.16e). This is called a backward compatibility. The following backward compatibilities may be taken into consideration in designing the IEEE 802.16m.

First, a user equipment (UE) of a new technology should operate with the same performance as that of the base stations or UEs of the legacy technology. Second, the system of the new technology and the system of an legacy technology should operate at the same radio frequency (RF) carrier and at the same bandwidth. Third, a base station of the new technology should support the case where the UE of the new technology and the UE of the legacy technology coexist at the same RF carrier, and the performance of the overall system should be improved as high as the rate of the UEs of the new technology. Fourth, the base station of the new technology should support handover of the UE of the legacy technology and handover of the UE of the new technology to correspond to the performance of handover between the legacy base stations. Fifth, the base station of the new technology should support both the UE of the new technology and the UE of the legacy technology by the level the base station of the legacy technology supports the UE of the legacy technology.

The base station of the new technology performs scheduling on radio resources with respect to the UE of the legacy technology or the UE of the new technology within the bandwidth it can support. Scheduling of radio resources may be performed in a logical frame including a plurality of OFDM symbols in a time domain and a plurality of subchannels in a frequency domain. However, the IEEE 802.16m system does not clearly propose yet a frame structure that may satisfy the backward compatibility with respect to the IEEE 802.16e system.

Thus, a new frame structure that can satisfy the backward compatibility for the legacy system is required.

SUMMARY OF THE INVENTION

The present invention provide a method for transmitting data by using duplex frames to which two systems are applied.

In an aspect, a method of transmitting data in a wireless communication system includes transmitting first data via a first frame for a first wireless communication system, transmitting second data via a second frame for a second wireless communication system supporting backward compatibility with respect to the first wireless communication system, and transmitting control information with respect to the first and second frames, wherein the control information includes a frame control header (FCH) which indicates information about the second frame by using a reserved bit region of the first frame.

In another aspect, a method of transmitting data in a wireless communication system includes receiving a radio frame including a plurality of OFDM symbols and a plurality of subcarriers; determining whether or not a first preamble is detected from the radio frame, if a first preamble is detected, determining whether or not a second preamble, which is different from the first preamble in terms of a time domain or a frequency domain or a code domain, is detected from the radio frame, and estimating the format of the radio frame according to whether or not the first and second preambles are detected, and receiving data transmitted via the radio frame.

In another aspect, a method of transmitting data in a wireless communication system includes receiving a radio frame including a plurality of OFDM symbols and a plurality of subcarriers, determining whether or not a preamble is detected from the radio frame, if a preamble is detected, decoding a mode indicator included in the radio frame, and estimating the format of the radio frame according to whether or not a preamble is detected and according to the value of the mode indicator, and receiving data transmitted via the radio frame.

DETAILED DESCRIPTION OF THE INVENTION

Figure 1:
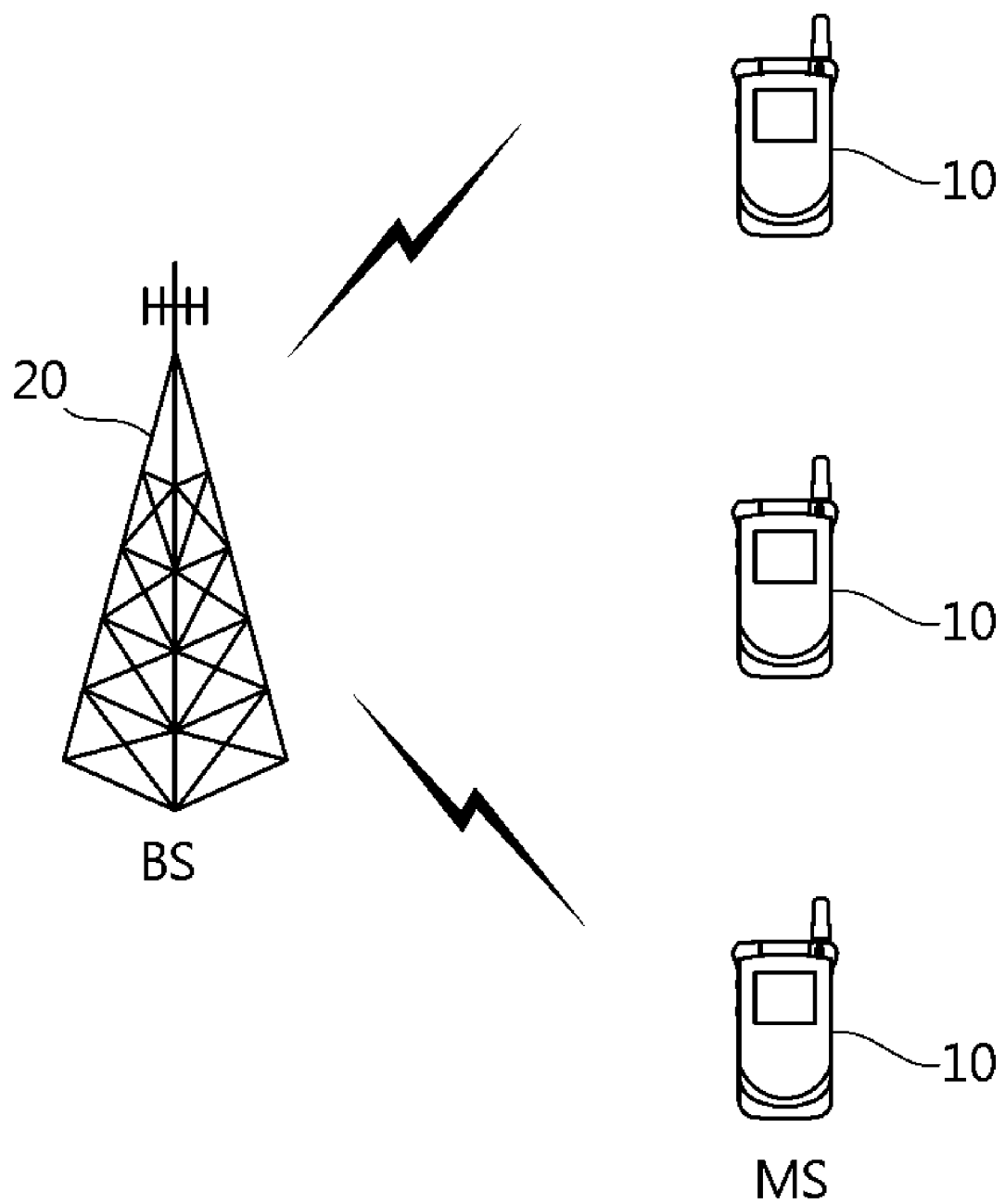
FIG. 1 is a block diagram showing a wireless communication system.

FIG. 1 shows a wireless communication system. The wireless communication system is widely deployed to provide a variety of communication services, such as voices, packet data, etc.

Referring to FIG. 1, the wireless communication system includes a base station (BS) 20 and user equipments (UEs) 10. The UEs 10 may be fixed or have mobility, and may be referred to as another terminology, such as a mobile station (MS), a user terminal (UT), a subscriber station (SS), a wireless device, etc. The BS 20 generally refers to a fixed station that communicates with the UEs 10 and may be called another terminology, such as a node-B, a base transceiver system (BTS), an access point, etc. One or more cells may exist within the coverage of the BS 20.

Hereinafter, downlink refers to communication from the BS 20 to the UEs 10, and uplink refers to communication from the UES 10 to the BS 20. In the downlink, a transmitter may be a part of the BS 20, and a receiver may be a part of the UEs 10. In the uplink, a transmitter may be a part of the UEs 10, and a receiver may be a part of the BS 20.

There is no restriction in multi-access schemes applied for the wireless communication system. That is, various multi-access schemes such as CDMA (Code Division Multiple Access), TDMA (Time Division, Multiple Access), FDMA (Frequency Division Multiple Access), SC-FDMA (Single-Carrier FDMA), and OFDMA (Orthogonal Frequency Division Multiple Access) may be used.

Figure 2:
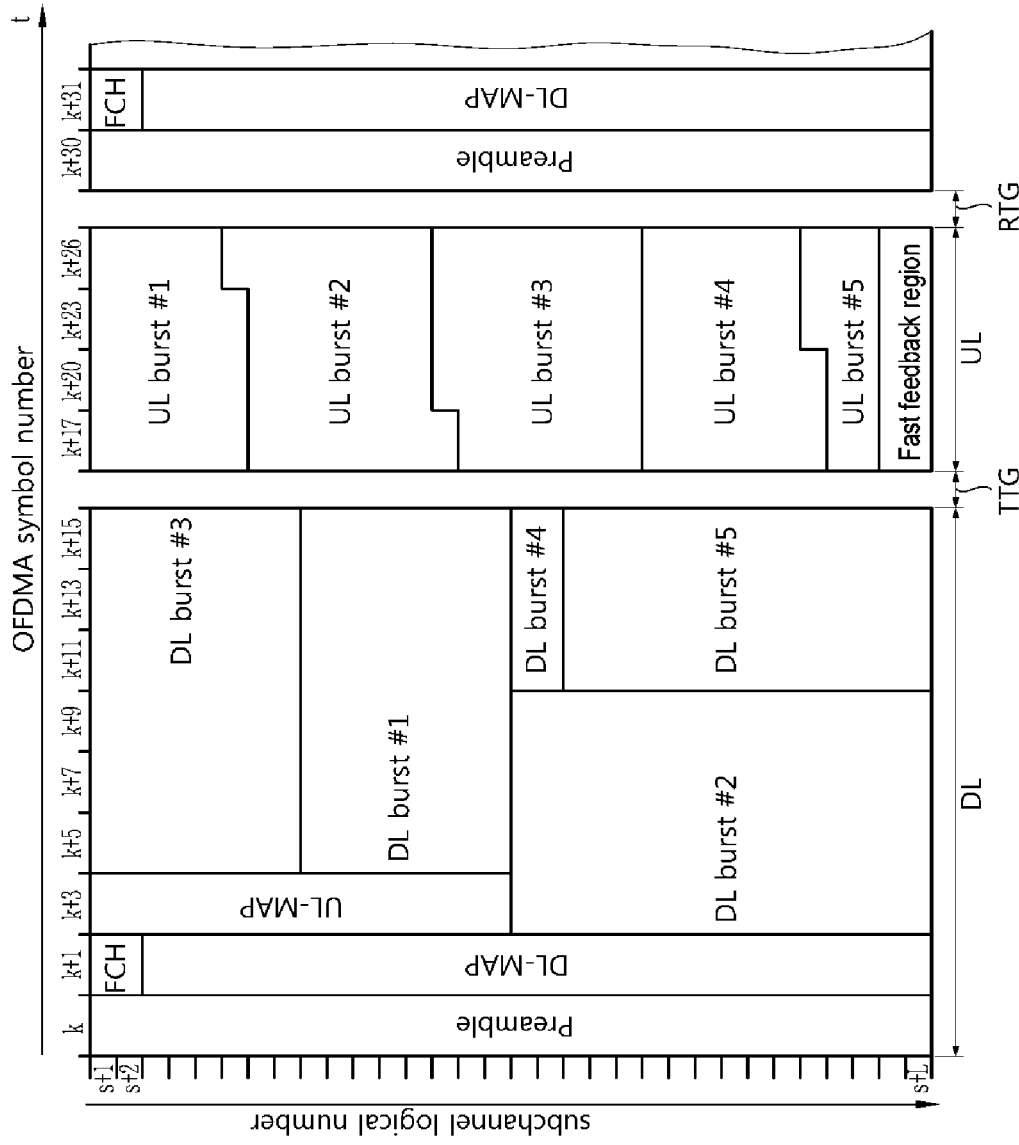
FIG. 2 shows an example of a frame structure.

FIG. 2 shows an example of a frame structure. The frame is a data sequence during a fixed time period used by physical specifications. It may refer to the paragraph 8.4.4.2 of "Part 16: Air Interface for Fixed Broadband Wireless Access Systems" of IEEE standards 802.16-2004 (Reference document 1).

Referring to FIG. 2, the frame includes a downlink frame and an uplink frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, burst regions, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between a downlink burst and a subsequent uplink burst. A receive/transmit transition gap (RTG) refers to a gap between the uplink burst and a subsequent downlink burst.

The preamble is used for initial synchronization between a base station and a UE, cell search, frequency offset, and channel estimation. The FCH includes the length of a DL-MAP message and coding information of the DL-NAP message.

The DL-MAP is a region on which the DL-MAP message is transmitted. The DL-NAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to the characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to the characteristics of an uplink physical channel, and the UCD is periodically transmitted by the base station via a UCD message.

Hereinafter, a slot is a minimum available data allocation unit and defined as time and a subchannel. The number of subchannels depends upon the size of FFT and time-frequency mapping. Subchannels include a plurality of subcarriers. The number of subcarriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. Reference document 1 discloses permutations such as FUSC, PUSC, O-FUSC (Optional-FUSC), O-PUSC (Optional-PUSC), ANC (Adaptive Modulation and Coding), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, the subcarriers may be divided into tiles including four contiguous physical subcarriers on three OFDM symbols. Each subchannel includes six tiles. The O-PUSC is used only for uplink transmission, and each tile includes three continuous physical subcarriers on three OFDM symbols. Pilot is allocated to the center of tiles.

A duplex frame structure that can satisfy backward compatibility with respect to a legacy system will now be described. The duplex frame includes a resource domain supporting a legacy system and that supporting a new system/evolution system. The legacy system refers to an IEEE 802.16e system, and the new system may refer to IEEE 802.16m. The terms used in the frame structure of the 802.16e described above with reference to FIG. 2 may be defined and used in the same manner, or some of them may be changed to be defined.

Hereinafter, for the sake of explanation, the names related to the legacy system will be demonstrated by 'first' while the names related to the new system will be demonstrated by 'second'. The legacy system is called a first system, and the new system is called a second system. A region supporting the first system is called a first frame, and a region supporting the second system is called a second frame. A preamble with respect to the first frame is called a first preamble, and a preamble with respect to the second frame is called a second preamble. An FCH with respect to the first frame is called a first FCH, and an FCH with respect to the second frame is a second FCH, A MAP with respect to the first frame is called a first MAP, and a MAP with respect to the second frame is called a second MAP. A control region in the second frame is called a second control region, and the second control region may refer to the second FCH and/or the second MAP. A burst of the first frame is called a first burst, and a burst of the second frame is called a second burst, a UE that can use a service of the first system is called a first UE, and a UE that can use a service of the second system is called a second UE. A BS providing a service of the first system is a first BS, and a base station providing services of the first and second systems is called a second BS. The second UE may use the service of the first system as well as that of the second system, while the first UE may not use the service of the second system. Namely, the second UE can decode every resource domain in the duplex frame structure, but the first UE can decode a resource domain limited to the first frame. A scheme providing only the service of the first system is called a legacy only mode, a scheme providing only the service of the second system is called a legacy disabled mode, and a scheme supporting all the services of both the first and second systems is called a duplex frame mode.

<Using the Same Bandwidth by the First and Second Systems>

The second system, an evolved system compared with the first system, may use the same bandwidth as that of the first system or may use a wider bandwidth than that of the first system. The duplex frame structure that may be applicable for the case where the first and second systems use the same bandwidth will now be described. The duplex frame structure is a frame for supporting the duplex frame mode.

Figure 3:
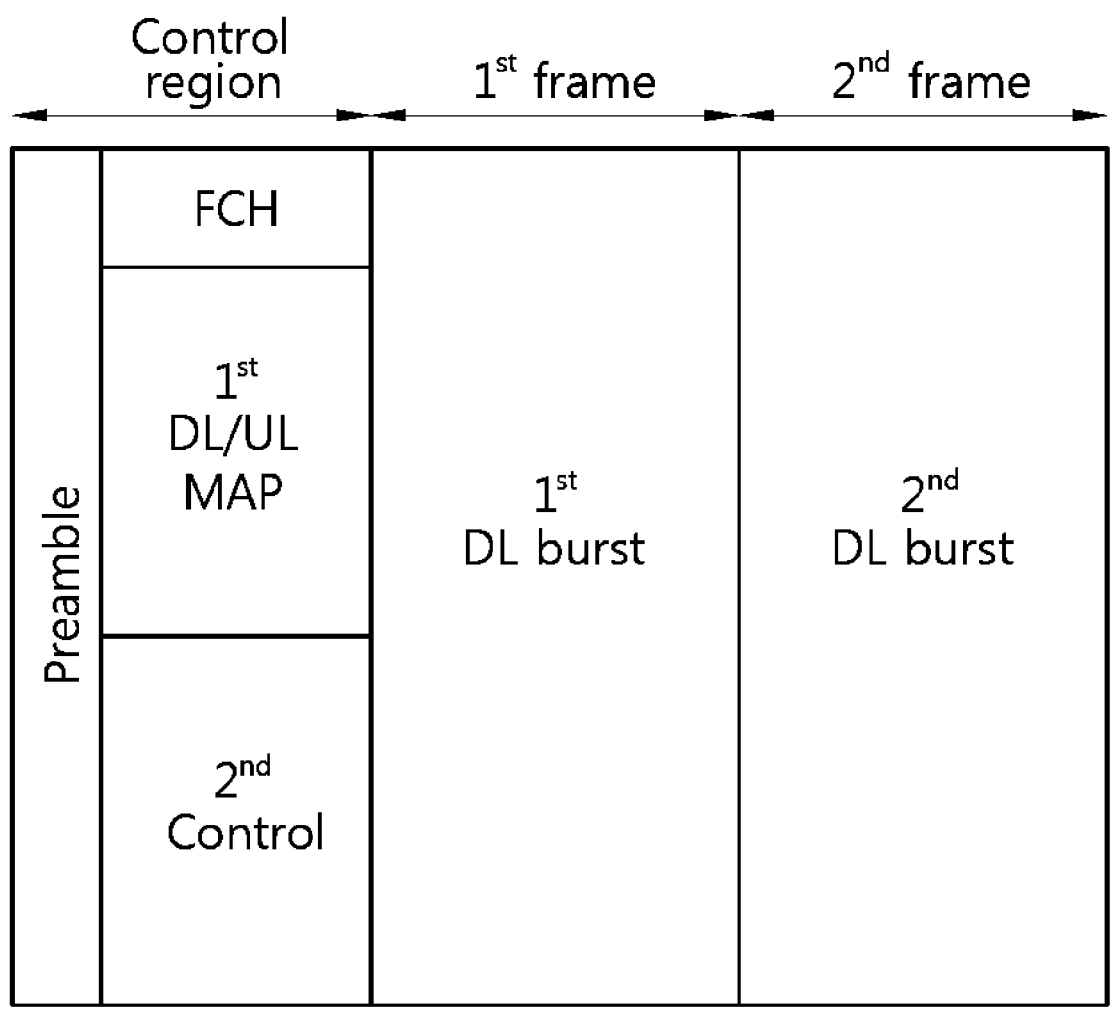
FIG. 3 shows a duplex frame structure according to one embodiment of the present invention.

FIG. 3 shows a duplex frame structure according to one embodiment of the present invention.

Referring to FIG. 3, the duplex frame includes a control region and first and second frame. The first frame temporally goes ahead of the second frame. The second frame can be considered as a start point in a repetition structure of frames. The control region includes a preamble, an FCH, a first DL/UL MAP, and a second control region. Here, the DL/UL MAP is a region on which a DL-MAP message and/or a UL-MAP message (referred to as 'DL/UL MAP message', hereinafter) are transmitted. The first frame includes a first DL burst, and the second frame includes a second DL burst. The first and second frames may be a data region. When a range to a time domain of the duplex frame has a certain size, the first and second frames may have a size that varies in the time domain. For example, if many users request to use the first system, the size of the first frame may be increased and the size of the second frame may be reduced. In the structure that the first frame temporally goes ahead of the second frame, the second frame has a variable start point.

Hereinafter, a 'position' refers to a code domain in code multiplexing as well as to a position in a time domain or a frequency domain.

The FCH includes information about the length and a coding scheme of the first DL/UL MAP message. The FCH indicates whether or not there is the second control region, and includes information about the length and a coding scheme of a second control region message. The first DL/UL MAP defines a first DL burst, and the second control region defines a second DL burst. The FCH of the IEEE 802.16e includes five reserved bits, so whether or not there is the second control region message may be indicated by using some of the reversed bits.

When the first UE receives the preamble, it can acquire information about the first DL/UL MAP from the first FCH and information about the first DL burst from the first DL/UL MAP. When the second UE receives the preamble, it can check whether or not the second control region exists from the first FCH. In this case, information about whether or not the second DL/UL MAP exists may be transmitted by using the reversed bits without changing the original structure of the FCH. Namely, the second UE can check in which one of the legacy only mode, the legacy disabled mode, and the duplex frame mode the BS provides a service, from the FCH. Upon checking the presence of the second control region from the first FCH, the second UE may acquire information about a start position of the second frame, the structure of the second DL burst, or the like, from the second control region that follows the first DL/UL MAP.

Figure 4:
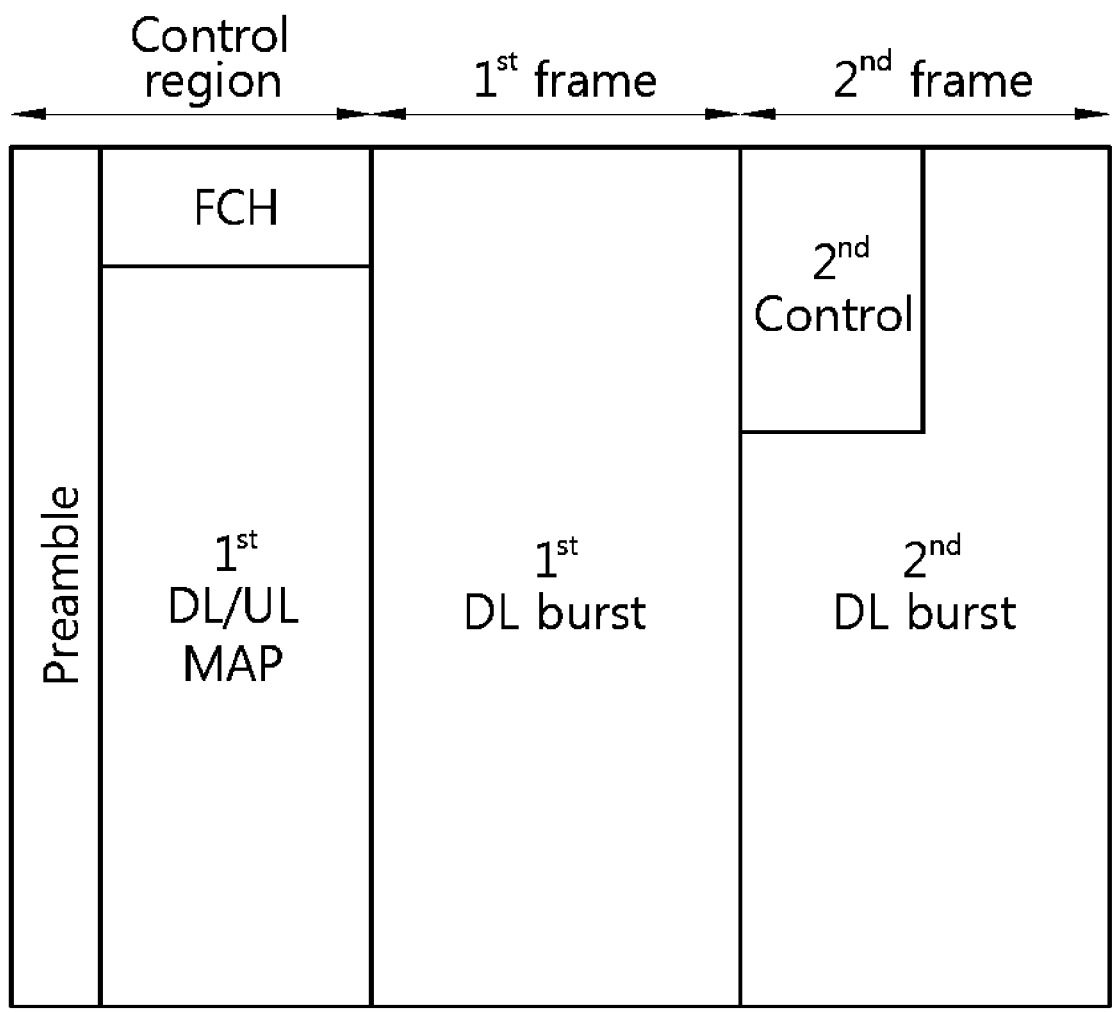
FIG. 4 shows a duplex frame structure according to another embodiment of the present invention.

FIG. 4 shows a duplex frame structure according to another embodiment of the present invention.

Referring to FIG. 4, the duplex frame structure of FIG. 4 has the second control region positioned at the second frame, compared with the duplex frame structure of FIG. 3.

The first FCH includes information about the presence or absence of the second control region and the position (time, frequency, code) of the second control region. When the position of the second control region is indicated by using the reserved bits of the first FCH, it means that the second control region exists. The position of the second control region may refer to a position (time, frequency, code) from which the second frame starts. If the position of the second DL/UL MAP is different from the start position of the second frame, the reserved bits of the first FCH may indicate the start position of the second frame. When an OFDM symbol offset and the duplex frame are divided into several subframes, the start position of the second frame may be expressed as a subframe index from which the second frame starts, a TTI (Transmission Time interval) indicating a period at which the second frames are transmitted, or the like. If the reserved bits of the first FCH are five bits, 32 values can be expressed, so the reserved bits of the first FCH can sufficiently express the subframe index from which the second frame starts or the TTI with respect to the second. Alternatively, a position of a minimum OFDM symbol from which the second frame may start may be determined, and the start position of the second frame from the minimum OFDM symbol may be expressed as an OFDM symbol offset.

After the second UE receives the first preamble, it can check whether or not the second control region exists and the position of the second control region from the first FCH. The second UE can check the start position of the second frame to acquire information about the second DL burst from the second control region. If the first FCH indicates only the presence or absence of the second control region (as shown in FIG. 3), the second UE should necessarily decode a first DL/UL MAP message to check a subsequent second control region message. However, if the first FCH indicates whether or not the second control region exists and also information about the position of the second control region (as shown in FIG. 4), the second UE can directly search and decode the second control region message, without the necessity of decoding the first DL/UL MAP message, so unnecessary power consumption can be reduced.

Figure 5:
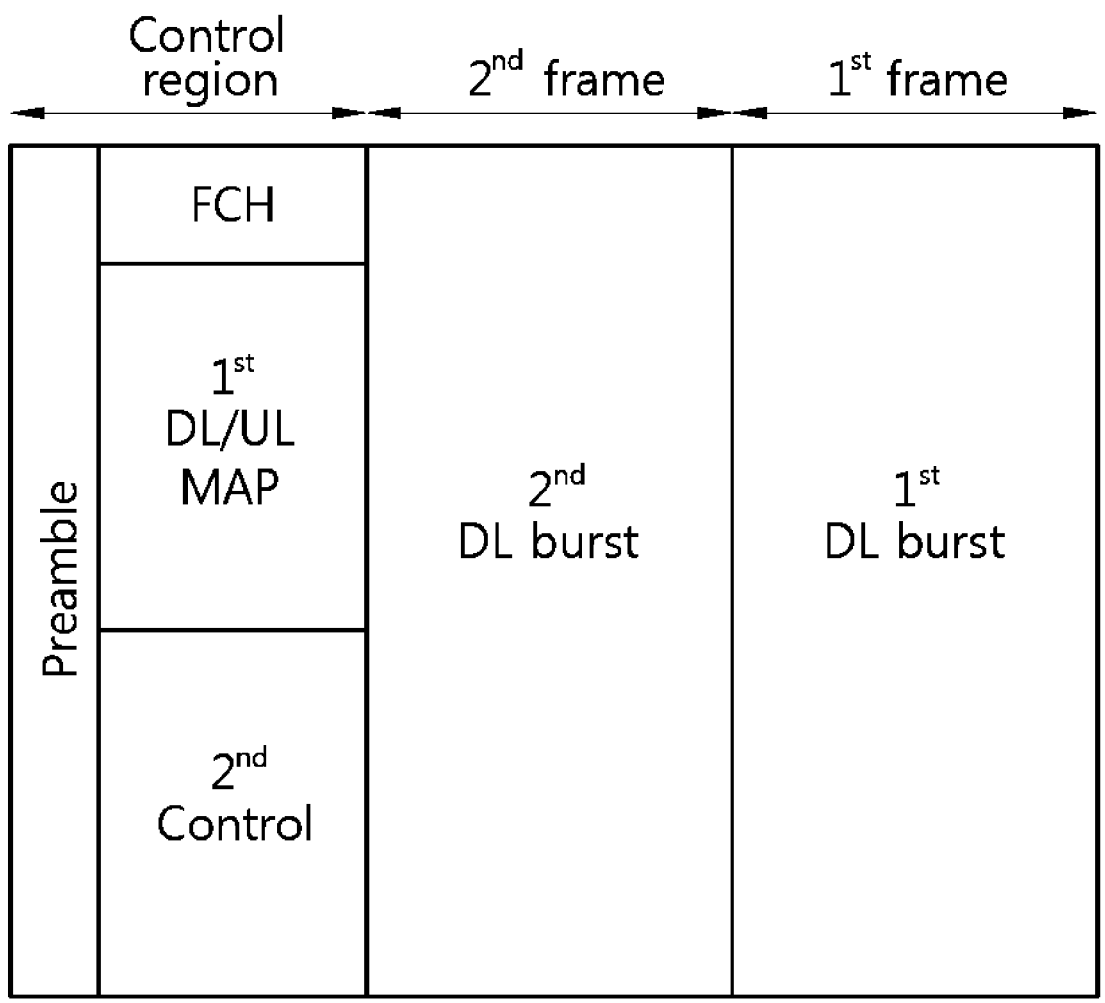
FIG. 5 shows a duplex frame structure according to still another embodiment of the present invention.

FIG. 5 shows a duplex frame structure according to still another embodiment of the present invention.

Referring to FIG. 5, the duplex frame includes a control region and first and second frames, in which the second frame temporally goes ahead of the first frame. The control region includes a first preamble, a first FCH, a first DL/UL MAP, and a second control region. The second frame starts from a next OFDM symbol of the control region and may have a fixed start position (time, frequency, code). The start position of the first frame may vary and may be indicated by the first DL/UL MAP.

The first FCH includes information about the length and coding scheme of the first DL/UL MAP message. The first FCH indicates whether or not the second control region exists, and the presence or absence of the second control region may be indicated by using reserved bits of the first FCH.

When the second UE receives the first preamble, it can check whether or not the second control region exists from the first FCH. Upon checking the presence of the second control region from the first FCH, the second UE can acquire information about the start position of the second frame, the structure of the second DL burst, or the like, from the second control region that follows the first DL/UL MAP.

Figure 6:
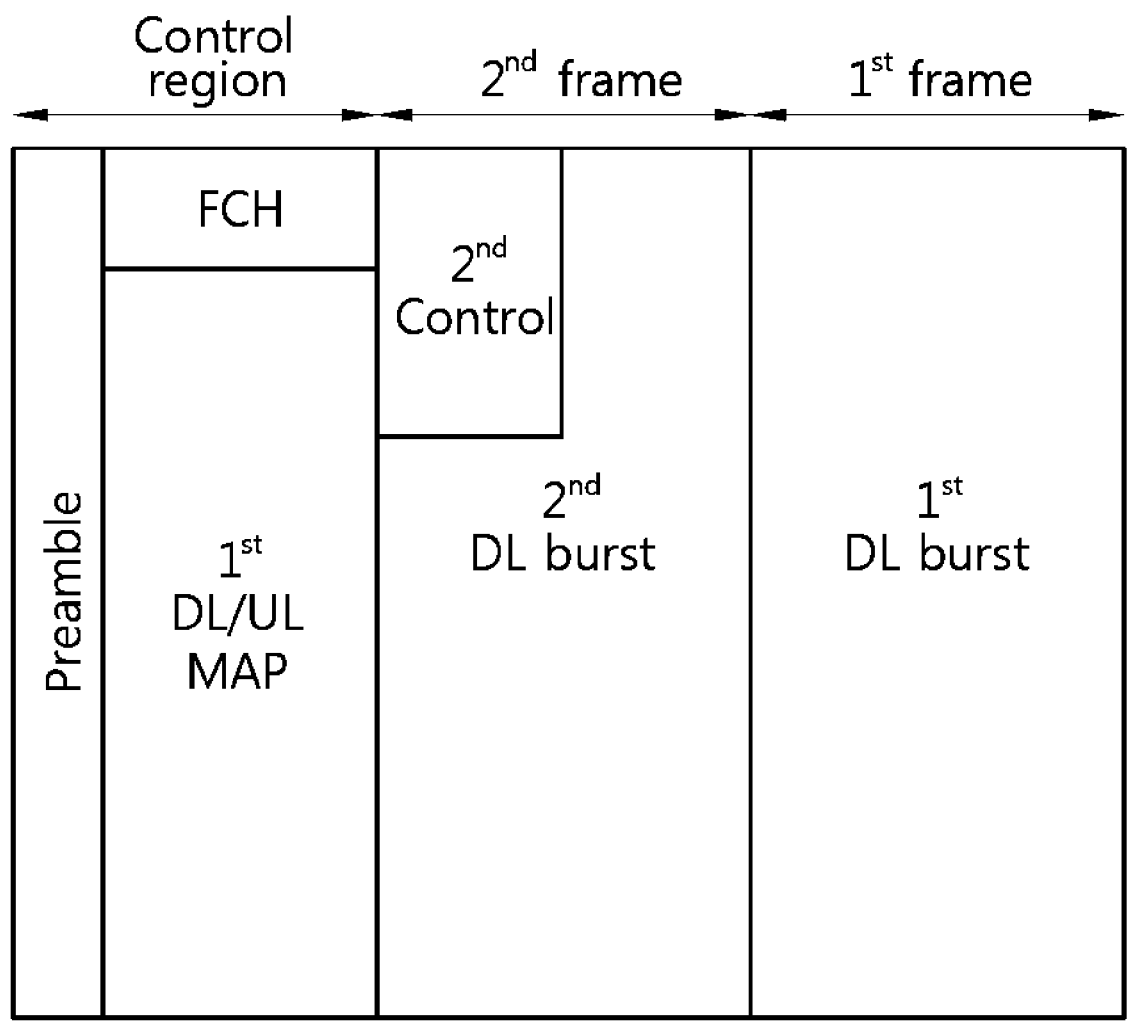
FIG. 6 shows a duplex frame structure according to still another embodiment of the present invention.

FIG. 6 shows a duplex frame structure according to still another embodiment of the present invention.

Referring to FIG. 6, the duplex frame structure of FIG. 6 has the second control region positioned at the second frame, compared with the duplex frame structure of FIG. 5.

The first FCH includes information about the presence or absence of the second control region and the position of the second control region. When the position of the second control region is indicated by using the reserved bits of the first FCH, it means that the second control region exists. The position of the second control region may be expressed as an OFDM symbol offset, a subframe index from which the second frame starts, a TTI indicating a period at which the second frames are transmitted, or the like.

After the second UE receives the first preamble, it can check whether or not the second control region exists and the position (time, frequency, code) of the second control region from the first FCH. By checking the position of the second control region from the first FCH, the second UE can check the position of the second control region and acquire information about the second DL burst from the second control region. Because the information about the position (time, frequency, code) of the second control region is included in the RCH, the second UE does not need to decode the first DL/UL MAP message.

Figure 7:
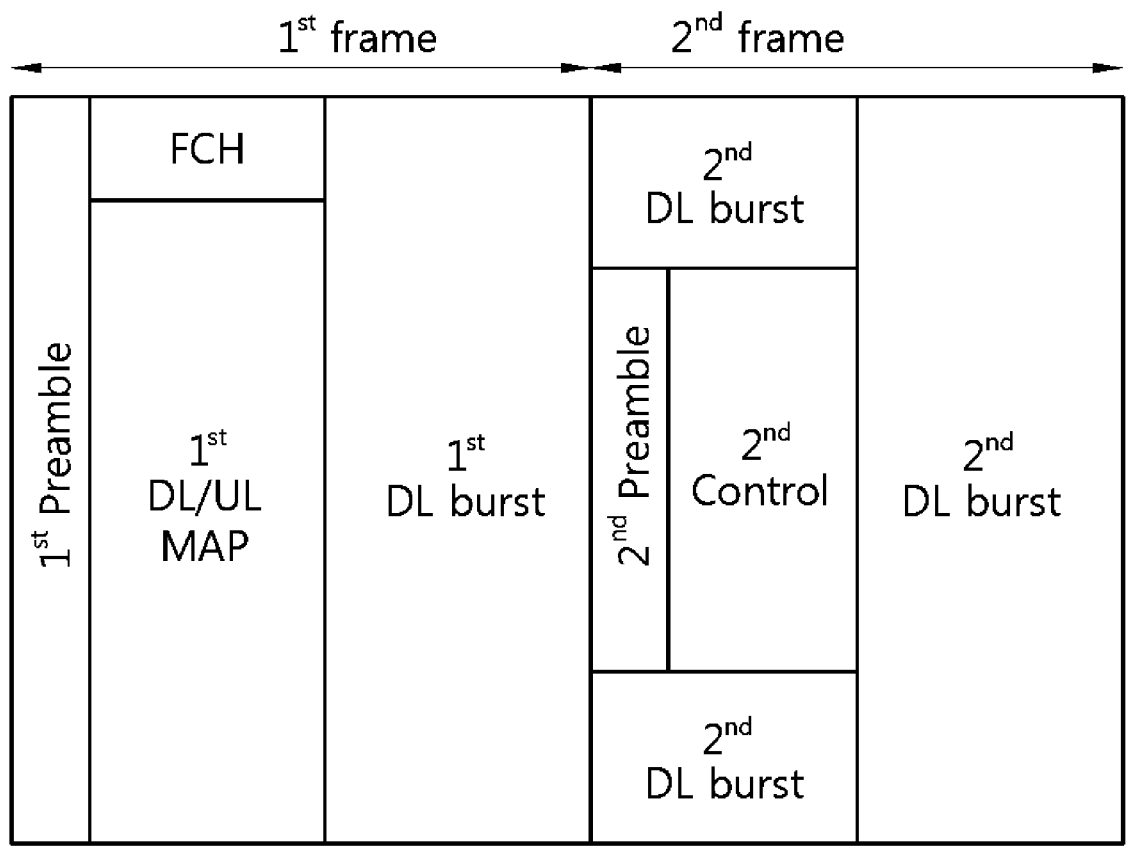
FIG. 7 shows a duplex frame structure according to still another embodiment of the present invention.

FIG. 7 shows a duplex frame structure according to still another embodiment of the present invention. A second preamble for the second system discriminated from the first preamble for the first system is additionally formed.

Referring to FIG. 7, the duplex frame includes first and second frames. The first frame includes a first preamble, the first FCH, the first DL/UL MAP, and a first DL burst. The second frame includes a second preamble, a second control region, and a second DL burst. The second preamble doesn't have to be the first position within the second frame. The second control region may include a second FCH. Here, it is shown that the first frame temporally goes ahead of the second frame, but the second frame may temporally goes ahead of the first frame.

When the bandwidth of the first preamble is 10 MHz, the bandwidth of the second preamble may be 5 MHz. This is not limited, and the second preamble is a preamble for supporting the second system, which needs only be discriminated from the first preamble. The position of the second preamble may be determined as a start position of the second frame. There exist an offset between the start position of the second frame and the second preamble. Here, the first and second preambles are shown according to a TDM (Time Division Multiplexing) in which they are temporally discriminated, but they may be also shown according to FDM (Frequency Division Multiplexing) in which they are discriminated by frequency or CDM (Code Division Multiplexing) in which they are discriminated by using orthogonal codes.

When the second UE enters a cell of the BS and performs an initial access, it attempts detecting of the first and second preambles. The second UE may check in which one of the legacy only mode, the legacy disabled mode, and the duplex frame mode the BS provides service, according to whether or not the first and second preambles are detected. When the second preamble is detected, the second UE acquires information about the second DL burst from the subsequent second DL/UL MAP. The first UE cannot know about the form of the second preamble nor whether or not the second preamble exists, and only detects the first preamble and operates.

In the above description, only the DL burst is shown in FIGS. 3 to 7, but the first frame may include a first DL burst and a first UL burst and the second frame may include a second DL burst and a second UL burst. The DL burst and the UL burst may be divided according to a TDD (Time Division Duplex) scheme and an FDD (Frequency Division Duplex) scheme. Alternatively, the first or second UL burst may be positioned to temporally follow the first or second frame. When the DL burst and the UL burst are disposed in the time domain, the first and second frames may be discriminated by a system transition gap (STG), a time gap for changing the systems.

<Using Different Bandwidths by the First and Second Systems>

A duplex frame structure that may be applied for a case where the second system uses a wider bandwidth than that of the first system will now be described.

Figure 8:
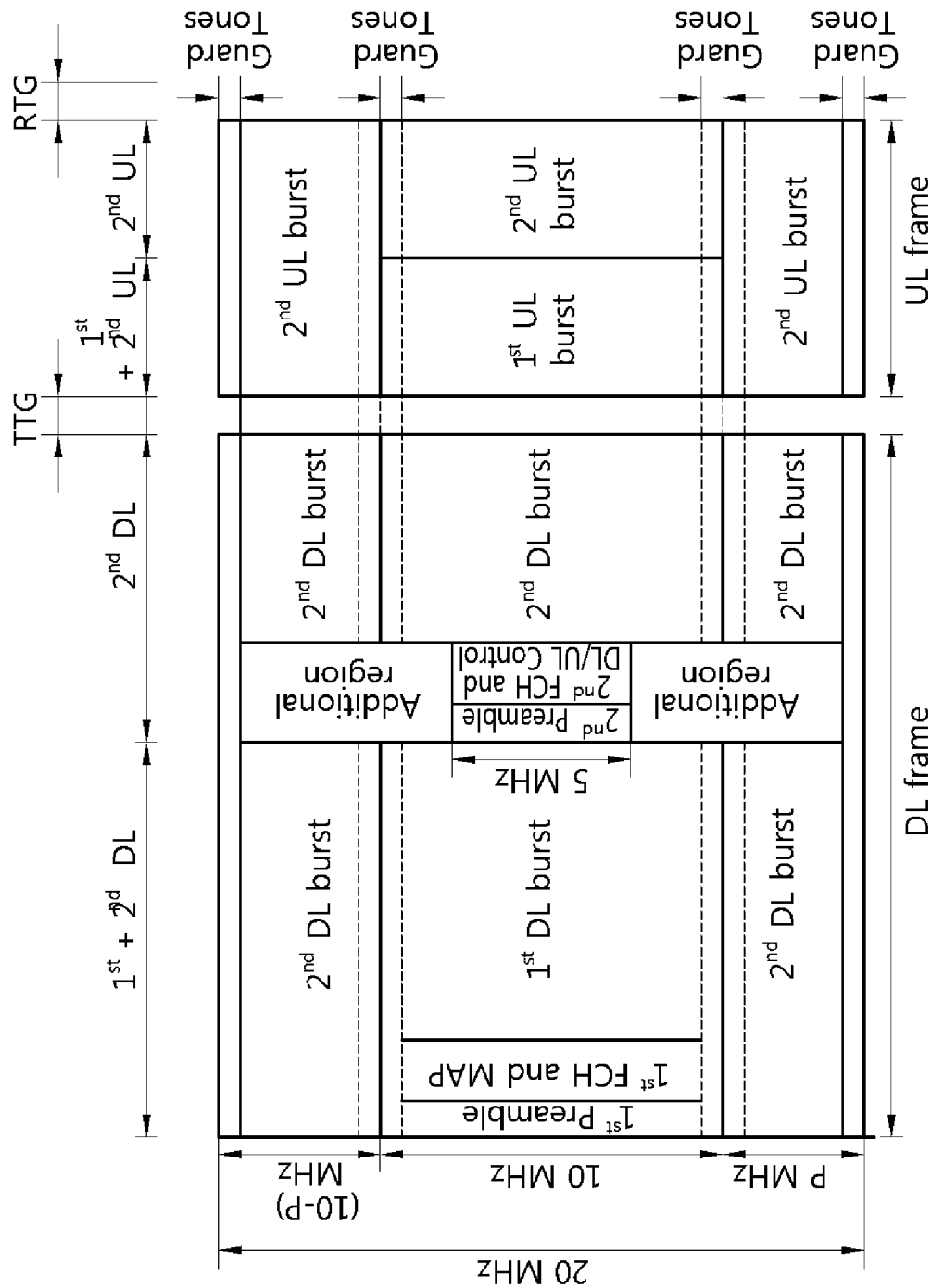
FIG. 8 shows a duplex frame structure according to still another embodiment of the present invention.

FIG. 8 shows a duplex frame structure according to still another embodiment of the present invention, in which a single second preamble is included in the duplex frame.

Referring to FIG. 8, it is assumed that the first system uses a 10 MHz bandwidth, and the second system uses a 20 MHz bandwidth including the bandwidth of the first system. The second system may use the bandwidth of the first system and an extended bandwidth (P MHz and (10-P) MHz).

The duplex frame includes a downlink (DL) frame and an uplink (UL) frame. The UL frame temporally follows the DL frame. The second frame can be considered as a start point in a repetition structure of frames. The DL frame is divided into a section ($1^{st}$ DL+$2^{nd}$ DL) in which the first and second DL frames are allocated together and a section ($2^{nd}$ DL) in which only the second DL frame is allocated. The UL frame is divided into a section ($1^{st}$ UL+$2^{nd}$ UL) in which first and second UL frames are allocated together and a section ($2^{nd}$ UL) in which only the second UL frame is allocated. The extended bandwidth is used only in the second system, so a control region or a data region for the second system is allocated to the extended bandwidth.

Within the bandwidth of the first system, the DL frame includes the first and second frames. The first frame includes a first preamble, a first FCH, a first DL/UL MAP and a first DL burst, and the second frame includes a second preamble, a second FCH, a second control region, and a second DL burst. The second preamble and the second FCH can be located arbitrary within the minimum system bandwidth of 5 MHz, and the second preamble and the second FCH can have different bandwidths. The second control region temporally follows the second preamble, and an additional region may be allocated up to the extended bandwidth on the same OFDM symbol as the control region. For example, if the second preamble has 5 MHz bandwidth so as to be discriminated from the first preamble, the second region may have a 5 MHz bandwidth, and an additional region may be allocated to the remaining 15 MHz bandwidth on the same OFDM symbol as the control region. The second FCH or a second control region message includes information about the extended bandwidth. The additional region may include additional information about the second system, information about the second DL burst or the second UL burst, and the second DL burst. The second DL burst is allocated to the extended bandwidth excluding the additional region in the DL frame. Within the bandwidth of the first system, the first and second UL bursts are included in the UL frame. The second UL burst is allocated to the extended bandwidth.

A TTG (Transmit/received Transition gap) is positioned between the UL frame and the DL frame, and a guard tone may be positioned at an edge of the bandwidth of the first system, namely, between the first system bandwidth and the extended bandwidth.

After the first UE receives the first preamble, it can receive data of the first DL burst or the first UL burst by acquiring control information from the first FCH and the first DL/UL MAP. The second UE may receive both signals of the bandwidth and of the first system and the extended bandwidth. After receiving the second preamble, the second UE acquires information about the extended bandwidth from the second FCH or the second control region. The second UE may buffer the control information of the additional region on the same OFDM symbol as the second control region and decode it based on the I n formation about the extended bandwidth. The additional control region of the control information buffered by the second UE may have a band smaller than the extended bandwidth. The second UE may acquire information about the extended bandwidth from the second control region when it makes an initial network access, and then receive the information about the extended bandwidth only when necessary.

Figure 9:
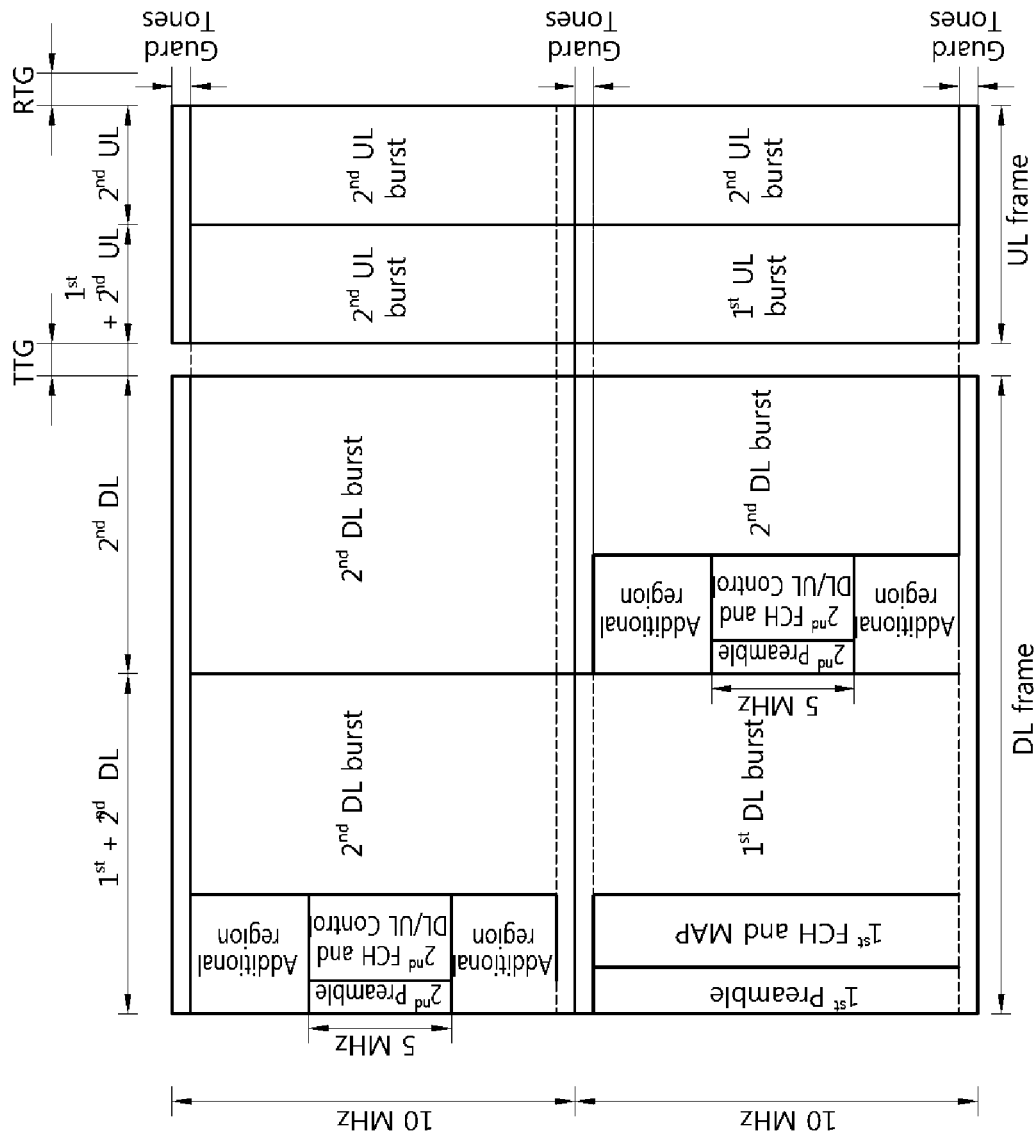
FIG. 9 shows a duplex frame structure according to still another embodiment of the present invention.

FIG. 9 shows a duplex frame structure according to still another embodiment of the present invention, in which a plurality of second preambles are included in the duplex frame.

Referring to FIG. 9, it is assumed that the first system uses 10 Mz bandwidth and the second system uses the bandwidth (10 MHz) of the first system and an extended bandwidth (10 MHz). Compared with the case as shown in FIG. 8, the second preamble is additionally provided in the DL frame of the extended bandwidth. The second preamble and the second FCH can be located arbitrary within the minimum system bandwidth of 5 MHz, and the second preamble and the second FCH can have different bandwidths. The second FCH and the second control region are provided temporally following the second preamble provided at the extended bandwidth, and information about an additional control region is included in the second FCH or the second control region. Information about the additional region with respect to the bandwidth of the first system is included in the second FCH or the second control region message at the bandwidth of the first system.

The second UE may check in which one of the legacy only mode, the legacy disabled mode and the duplex frame mode the BS provides a service by checking the first and second preambles at the first system bandwidth and the extended bandwidth. The second UE may acquire about the extended bandwidth from the second control region that follows the second preamble.

When the second preamble is additionally provided at the extended bandwidth, the extended bandwidth should have a size which is the same as or larger than a minimum size of the second preamble. The case where the bandwidth of the first system is 10 MHz and the extended bandwidth is 10 MHz has been described, but there is no limitation in the size of the bandwidth of the first system and the extended bandwidth. And, as for the second preamble which is additionally provided according to the size of the extended bandwidth, a plurality of such second preambles may be provide don the same FODM symbol.

A method for effectively discriminating an operation mode of the BS by the second UE in a situation that the first and second systems coexist will now be described. Because the structure of a frame is determined according to an operation mode of the BS, the second UE may estimate the structure of the frame by discriminating the operation mode of the BS. When the second UE enters a cell of the first BS or the second BS, it should discriminate in which one of the legacy only mode, the legacy disabled mode and the duplex frame mode the corresponding BS provides a service. In case of considering backward compatibility with respect to the first system, overhead may be increased due to control information for discriminating the first and second systems. A method for discriminating the operation mode of the BS by the second UE without increasing overhead will now be described.

<Discriminating Modes by Using First and Second Preambles>

The second UE needs to discriminate the first and second preambles without extra signaling. To this end, the second preamble should satisfy the following conditions.

1. The second preamble should not be only shortened or only lengthened in length in a frequency domain with the same form as that of the first preamble. If the second preamble is only shortened in a frequency domain compared with the first preamble, the first and second preambles cannot be discriminated by correlation in a preamble detection.

2. When the first preamble has a repetition form of a frequency tone, the second preamble should not have such a multiple of the repetition form of the first preamble. Although the second preamble has a different cycle with a multiple of the repetition form of the first preamble in the frequency tone, the first and second preambles overlap at every frequency tone of cycles corresponding to the least common multiple of the cycle of the first preamble and the cycle of the second preamble, a preamble detection performance may be degraded.

3. The second preamble should be designed to fit a minimum support bandwidth of the second system. In order for the second system to normally operate in the legacy disabled mode, the second preamble should be suitable for the minimum support bandwidth of the second system.

The second preamble satisfying the above-mentioned conditions may be well discriminated from the first preamble without confusion. Hereinafter, it is assumed that the second preamble satisfies the following conditions.

Figure 10:
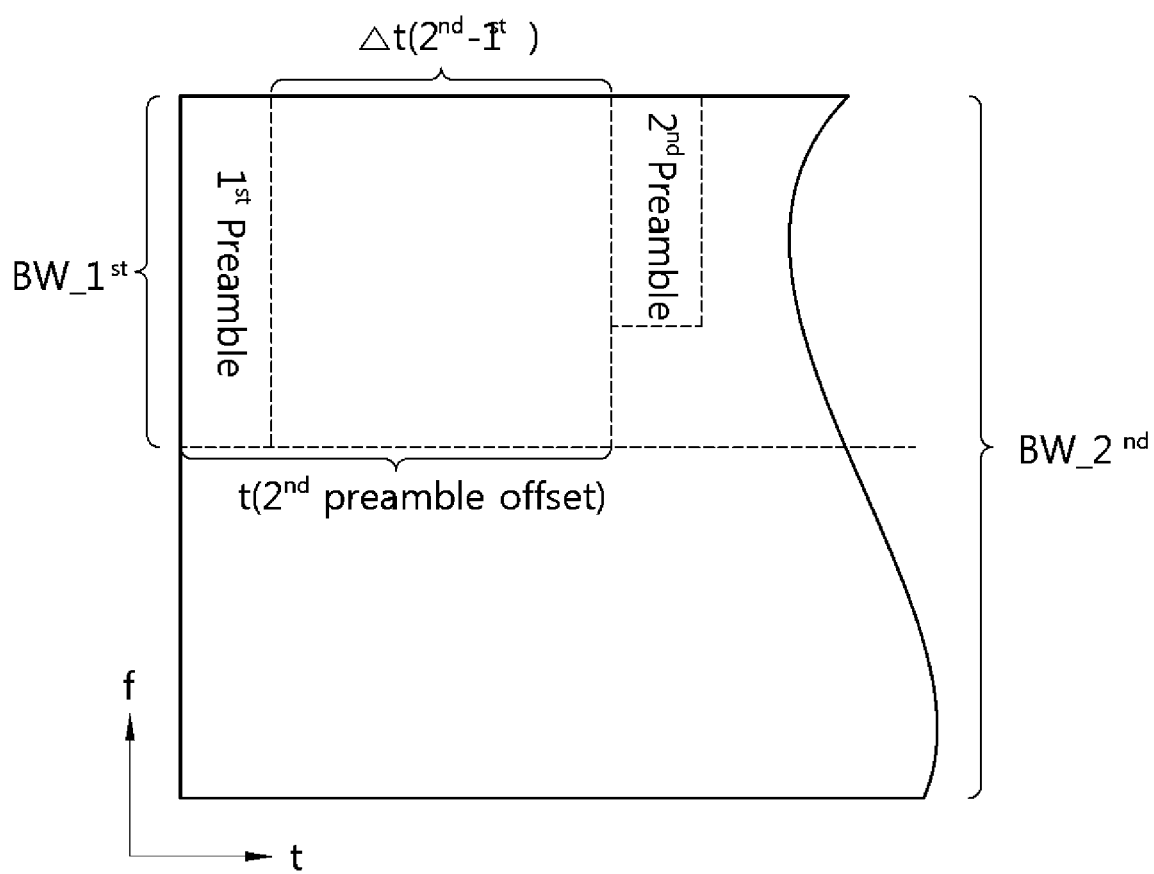
FIG. 10 shows a preamble for discriminating an operation mode of a base station in the duplex frame according to one embodiment of the present invention.

FIG. 10 shows a preamble for discriminating an operation mode of the BS in the duplex frame according to one embodiment of the present invention.

Referring to FIG. 10, the first and second preambles are positioned at different bands in the frequency domain. In the duplex frame, the second preamble may be positioned by an offset 'f' in the frequency domain. The second preamble may have a frequency interval as long as $\Delta f$ from the first preamble. 'f' or $\Delta f$ may be maintained to be uniform or may be changed at every frame.

Figure 11:
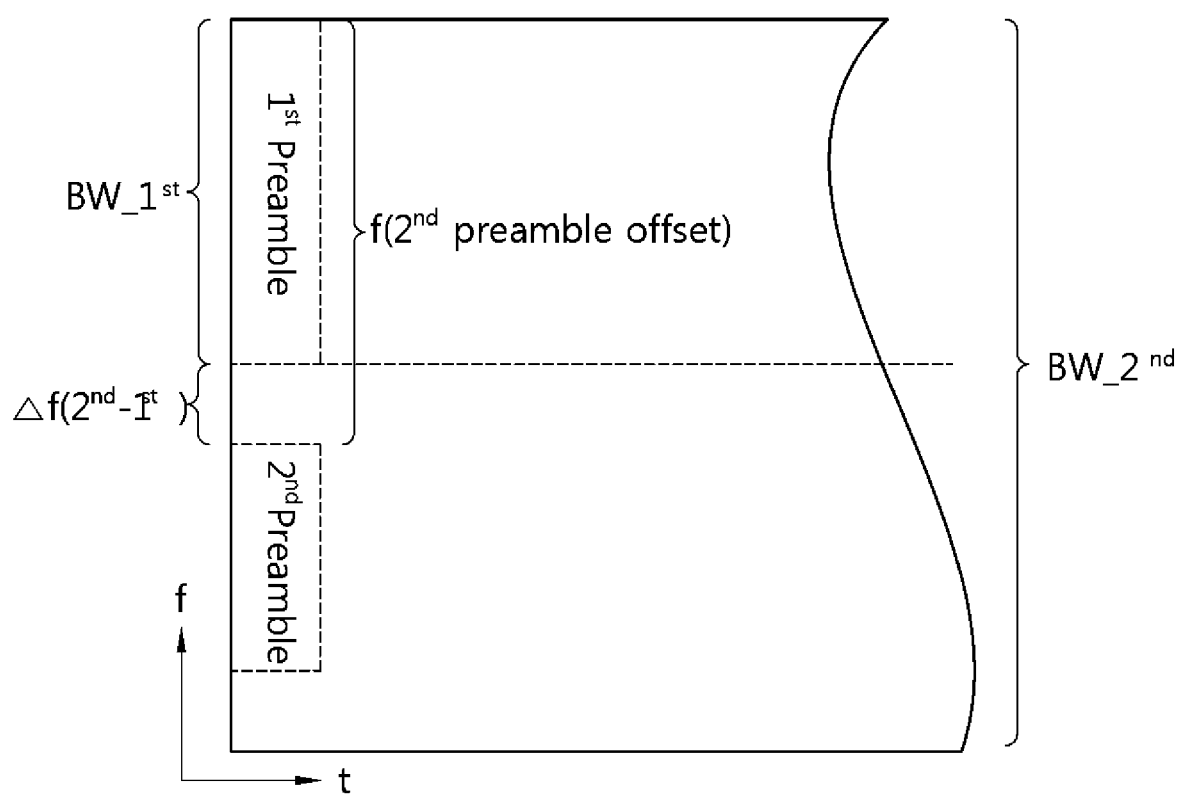
FIG. 11 shows a preamble for discriminating an operation mode of a base station in the duplex frame according to another embodiment of the present invention.

FIG. 11 shows a preamble for discriminating an operation mode of the BS in the duplex frame according to another embodiment of the present invention.

Referring to FIG. 11, the first preamble and the second preamble are positioned at each different time in the time domain. In the duplex frame, the second preamble may be positioned behind as long as an offset 't' in the time domain. The second preamble may have a time interval as long as $\Delta t$ from the first preamble. 't' or $\Delta t$ may have a uniform size or changed size at every frame. The first preamble is positioned within the bandwidth ($BW\_1^{st}$) of the first system, and the second preamble is positioned within the bandwidth ($BW\_2^{nd}$) of the second system.

Figure 12:
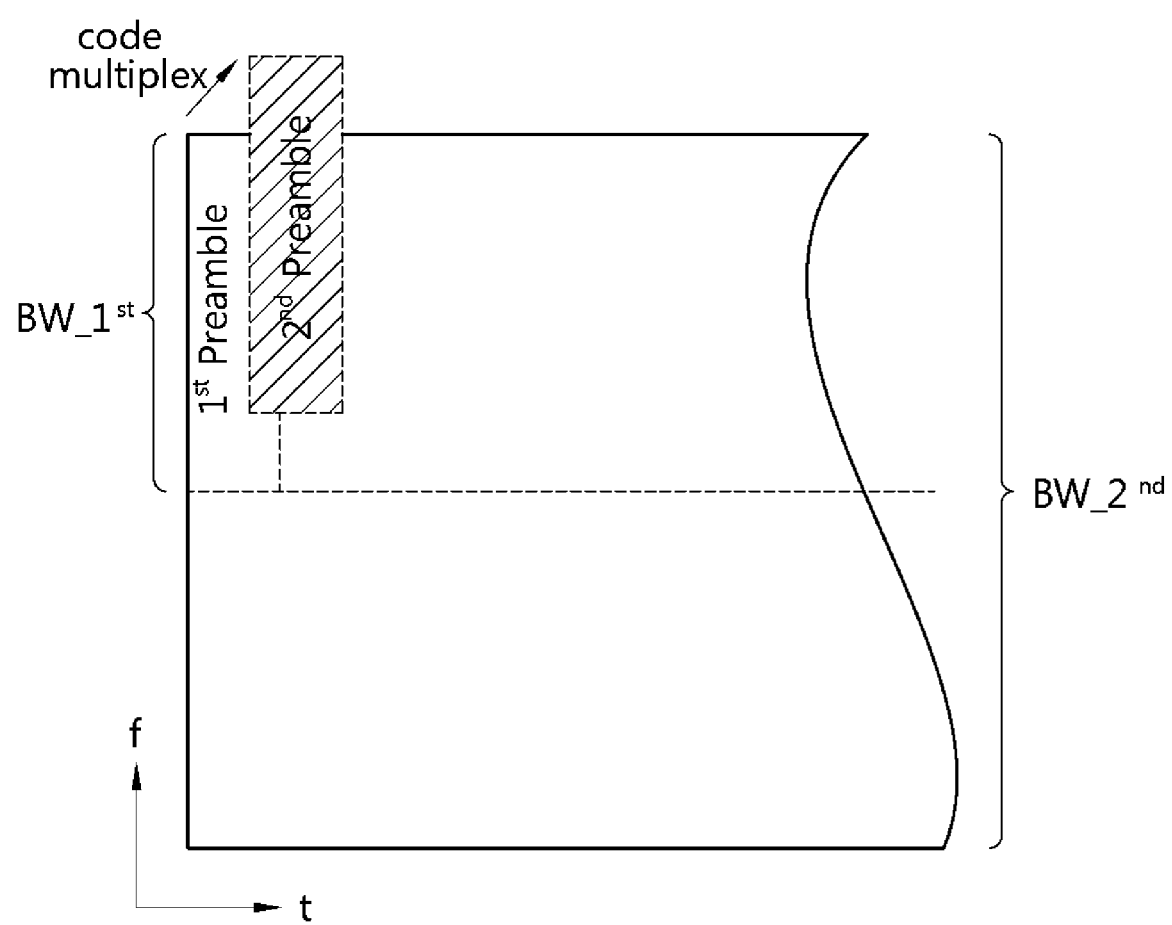
FIG. 12 shows a preamble for discriminating an operation mode of a base station in the duplex frame according to still another embodiment of the present invention.

FIG. 12 shows a preamble for discriminating an operation mode of a base station in the duplex frame according to still another embodiment of the present invention.

Referring to FIG. 12, the first and second preambles are code-multiplexed by using orthogonal codes which are mutually orthogonal. The second preamble may be positioned at an arbitrary region within the bandwidth ($BW\_2^{nd}$) of the second system. The second preamble may use the same resource domain with the first preamble, and the second and first preambles do not interfere with each other. As the orthogonal codes for the first and second preambles, previously agreed orthogonal codes may be used or the BS may inform about orthogonal codes to be used via a broadcast channel or the like.

In FIGS. 10 to 12, at least one of the first and second preambles is included in the radio frame. The second preamble may be allocated to a position different from that of the first preamble relatively in the time domain, the frequency domain, or in the code domain. Alternatively, the second preamble may be allocated to a fixed position in the duplex frame. The second UE can detect the first and second preambles and discriminate an operation mode of the BS among the legacy only mode, the legacy disabled mode, and the duplex mode by simply detecting the first and second preambles without any additional signaling.

Figure 13:
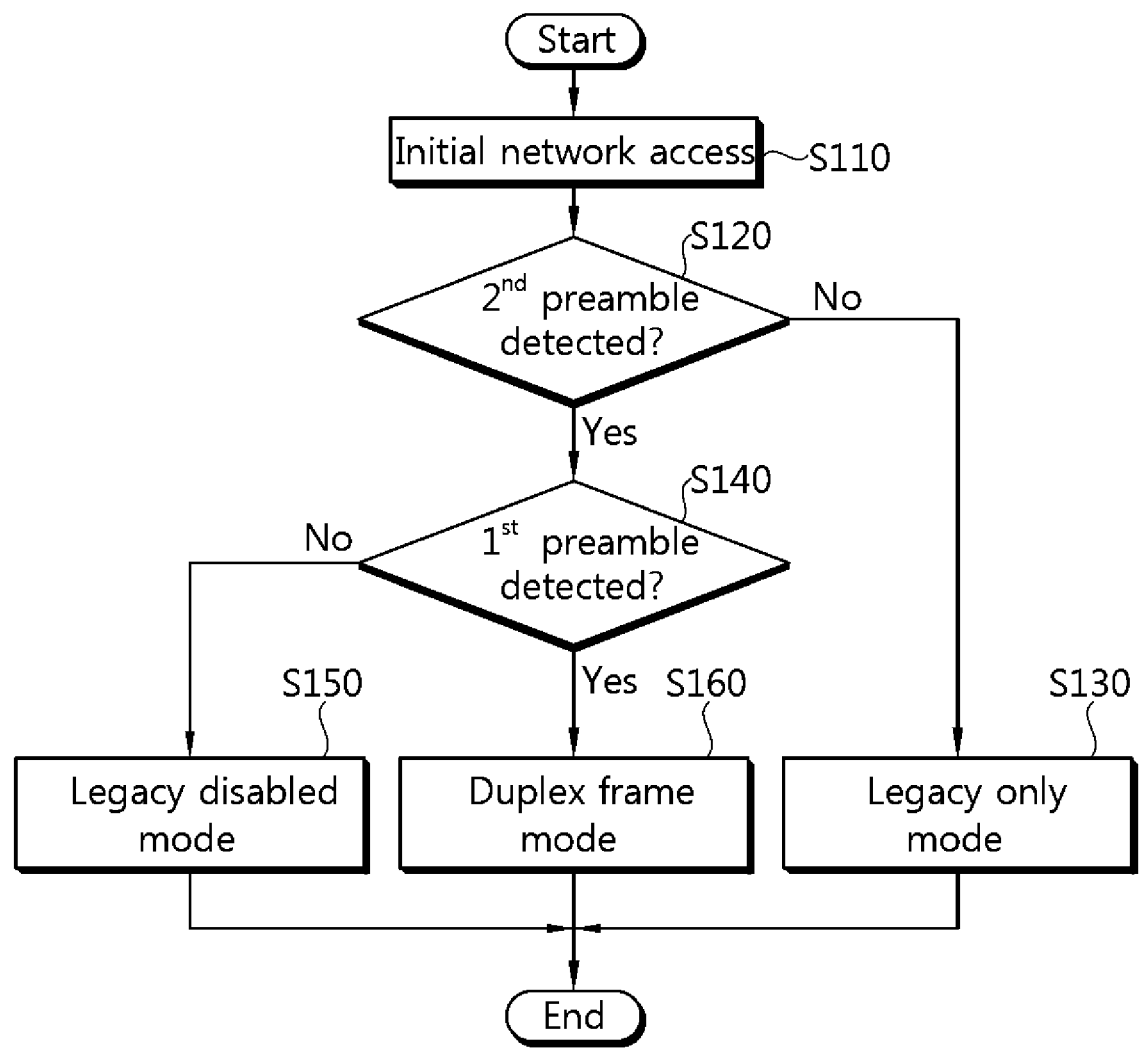
FIG. 13 is a flow chart illustrating a method for discriminating an operation mode of a base station by using a preamble according to one embodiment of the present invention.

FIG. 13 is a flow chart illustrating a method for discriminating an operation mode of the BS by using a preamble according to one embodiment of the present invention.

Referring to FIG. 13, the second UE enters a cell region of the BS and attempts an initial network access (S110). The second UE matches initial synchronization and receives a preamble to check an operation mode of the BS.

The second UE determines whether or not a second preamble is detected from a signal received from the BS (S120). The second preamble may be allocated to the bandwidth of the first system or the extended bandwidth, and in this case, because the second UE can receive a signal transmitted at the extended bandwidth as well as a signal transmitted at the bandwidth of the first system, it can also receive the second preamble transmitted at the extended bandwidth.

If the second preamble is not detected, the second UE recognizes that the BS operates in the legacy only mode (S130). The second UE may use a service of the first system such as requesting allocation of radio resources according to an operation scheme of the first system.

If the second preamble is detected, the second UE determines whether or not a first preamble is detected (S140). If the first preamble is not detected, the second UE recognizes that the BS operates in the legacy disabled mode (S150). The second UE can use a service of the second system according to an operation scheme of the second system. If the first preamble is detected, the second UE recognizes that the BS operates in the duplex frame mode (S160). The second UE can selectively use the service of the first system or the service of the second system.

Figure 14:
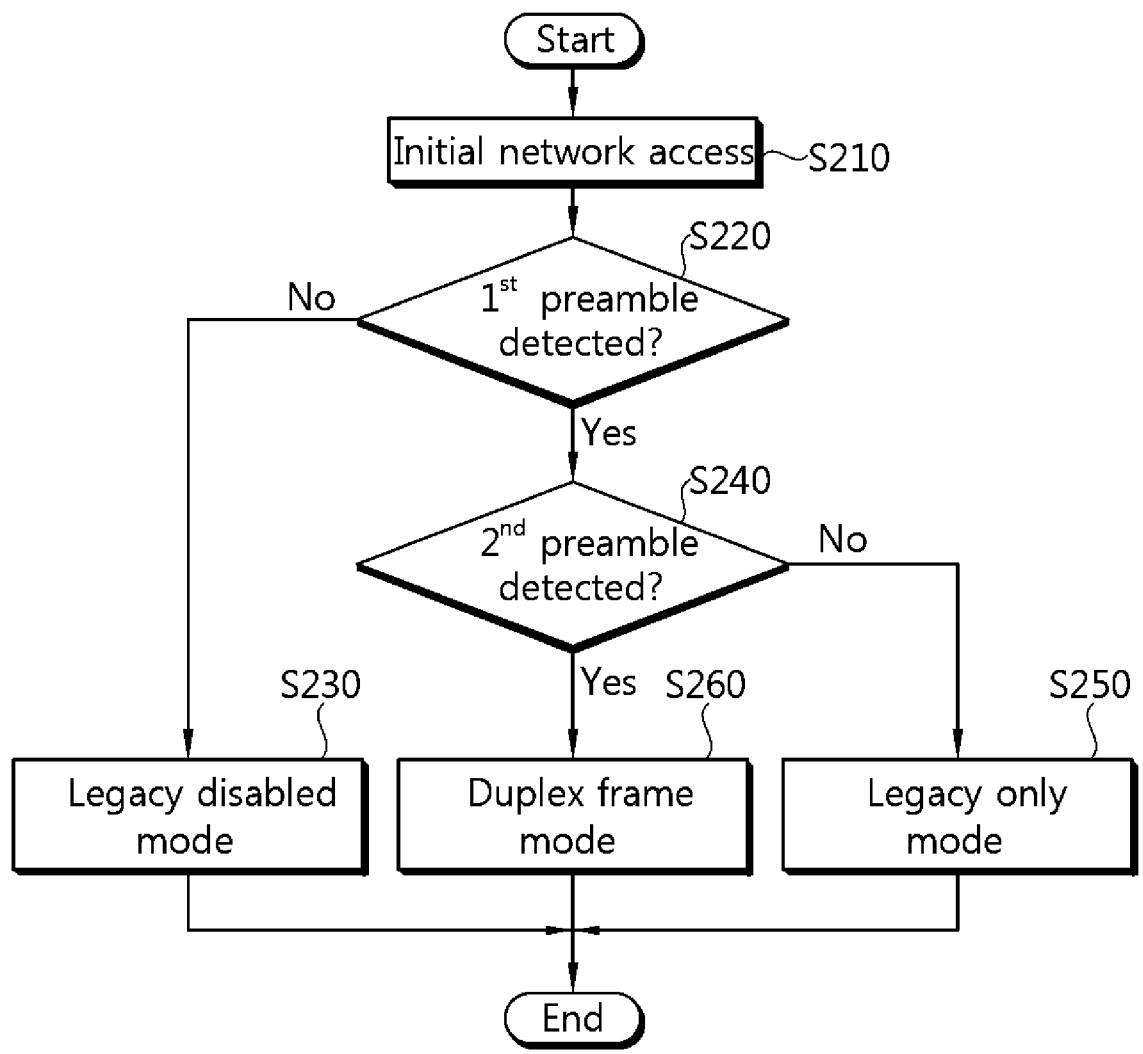
FIG. 14 is a flow chart illustrating a method for discriminating an operation mode of a base station by using a preamble according to another embodiment of the present invention.

FIG. 14 is a flow chart illustrating a method for discriminating an operation mode of a base station by using a preamble according to another embodiment of the present invention.

Referring to FIG. 14, the second UE enters a cell region of the BS and attempts an initial network access (S210). The second UE matches initial synchronization and receives a preamble to check an operation mode of the BS.

The second UE determines whether or not a first preamble is detected from a signal received from the BS (S220). If the first preamble is not detected, the second UE recognizes that the BS operates in the legacy disabled mode (S230) The second UE can use the service of the second system according to the operation scheme of the second system.

If the first preamble is detected, the second UE determines whether or not a second preamble is detected (S240). If the second preamble is not detected, the second UE recognizes that the BS operates in the legacy only mode (S250) The second UE can use the service of the first system according to the operation scheme of the first system.

If the second preamble is detected, the second UE recognizes that the BS operates in the duplex frame mode (S260). The second UE can selectively use the service of the first system or the service of the second system.

In this manner, the UE can discriminate the operation modes of the BS by simply detecting preambles, so there is no need to include additional control information in the control region of the FCH and the DL/UL MAP to discriminate the operation modes of the BS. Thus, the FCH and the DL/UL MAP can be more flexibly utilized. However, because the second UE should check whether or not the first and second preambles are detected to discriminate the operation modes of the BS, the initial network access procedure may be delayed.

<Discriminating Modes by Using a Preamble and FCH>

A method for discriminating operation modes of the BS by simply detecting a single preamble to prevent delay in the initial network access procedure will now be described. For this purpose, an operation mode of the BS is indicated by using reserved bits of the FCH. The reason for using the reserved bits of the FCH is to perform the operation of the second system while maintaining the operation process of the first system as it is without any intervention.

First, the method for indicating an operation mode of the BS by using the reserved bits of the FCH will now be described.

Figure 15:
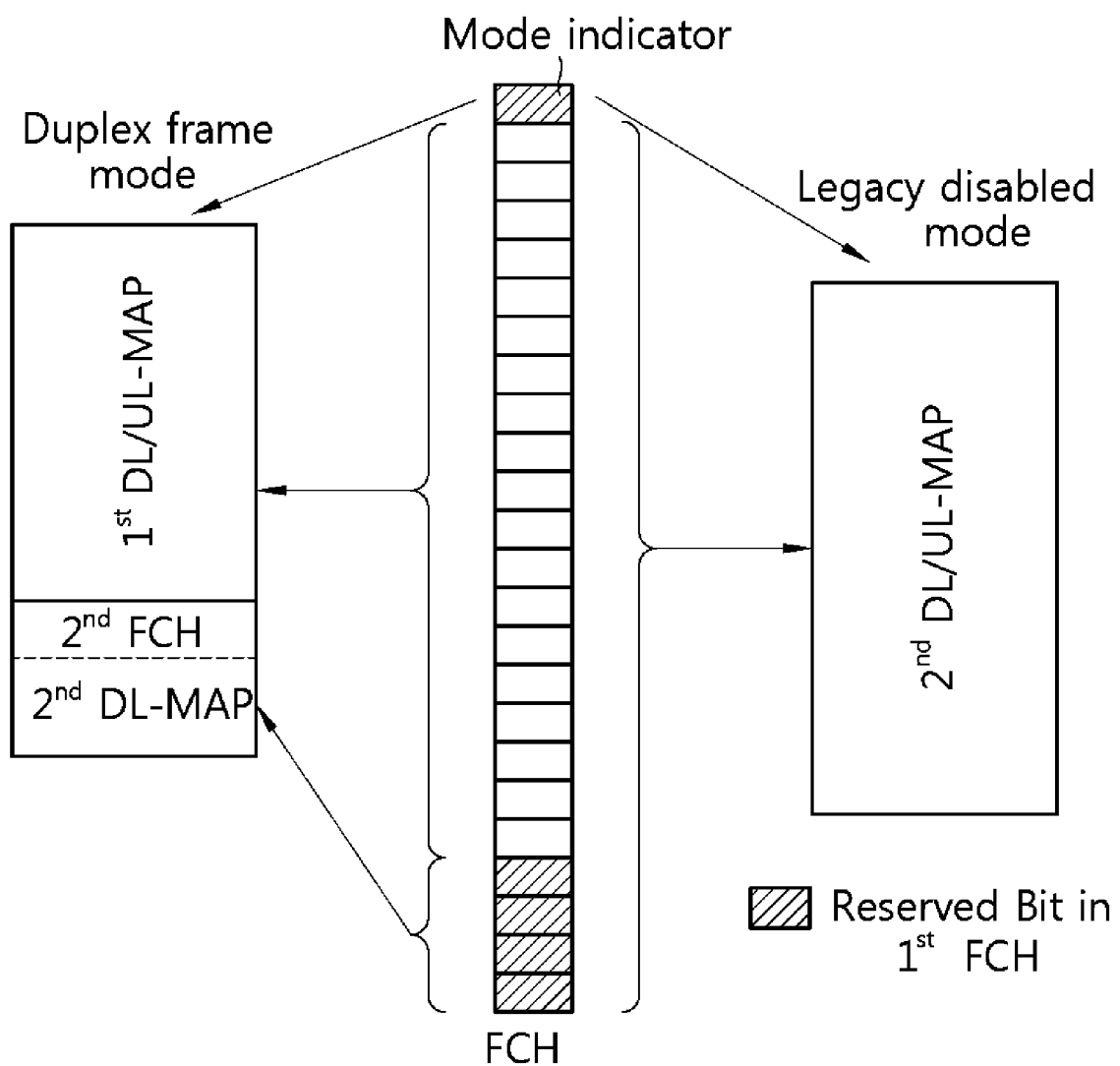
FIG. 15 shows an FCH according to an embodiment of the present invention.

FIG. 15 shows an FCH according to an embodiment of the present invention.

Referring to FIG. 15, the FCH includes bits including information about the DL/UL MAP and reserved bits that are not in use. For example, if the first system is the IEEE 802.16e, the RCH is 24 bits and five bits of 24 bits are set as reserved bits not in use. The FCH is transmitted via four slots in the logical structure of the PUSC subchannel. The 24-bit FCH is repeated into 48 bits, subject to a convolutional coding process of a ½ coding rate and repetition coding four times, mapped to QPSK (Quadrature Phase Shift Keying), and then transmitted. The operation mode of the BS and information about the second control region can be indicated by using the five reserved bits.

When there are five reserved bits in the FCH, 1 bit may be used as a mode indicator. If the mode indicator is '0', it may indicate the duplex frame mode, and if the mode indicator is '1', it may indicate the legacy disabled mode. When the mode indicator indicates the duplex frame mode, the other remaining four bits may indicate information about the second FCH or the second DL/UL MAP. If the mode indicator indicates the legacy disabled mode, the other remaining bits excluding the mode indicator in the FCH indicates the information about the second DL/UL MAP. If 'null' is included in the bit corresponding to the mode indicator and transmitted, it may indicate the legacy only mode. In the legacy only mode, none is carried in the reserved bits of the FCH and transmitted.

Figure 16:
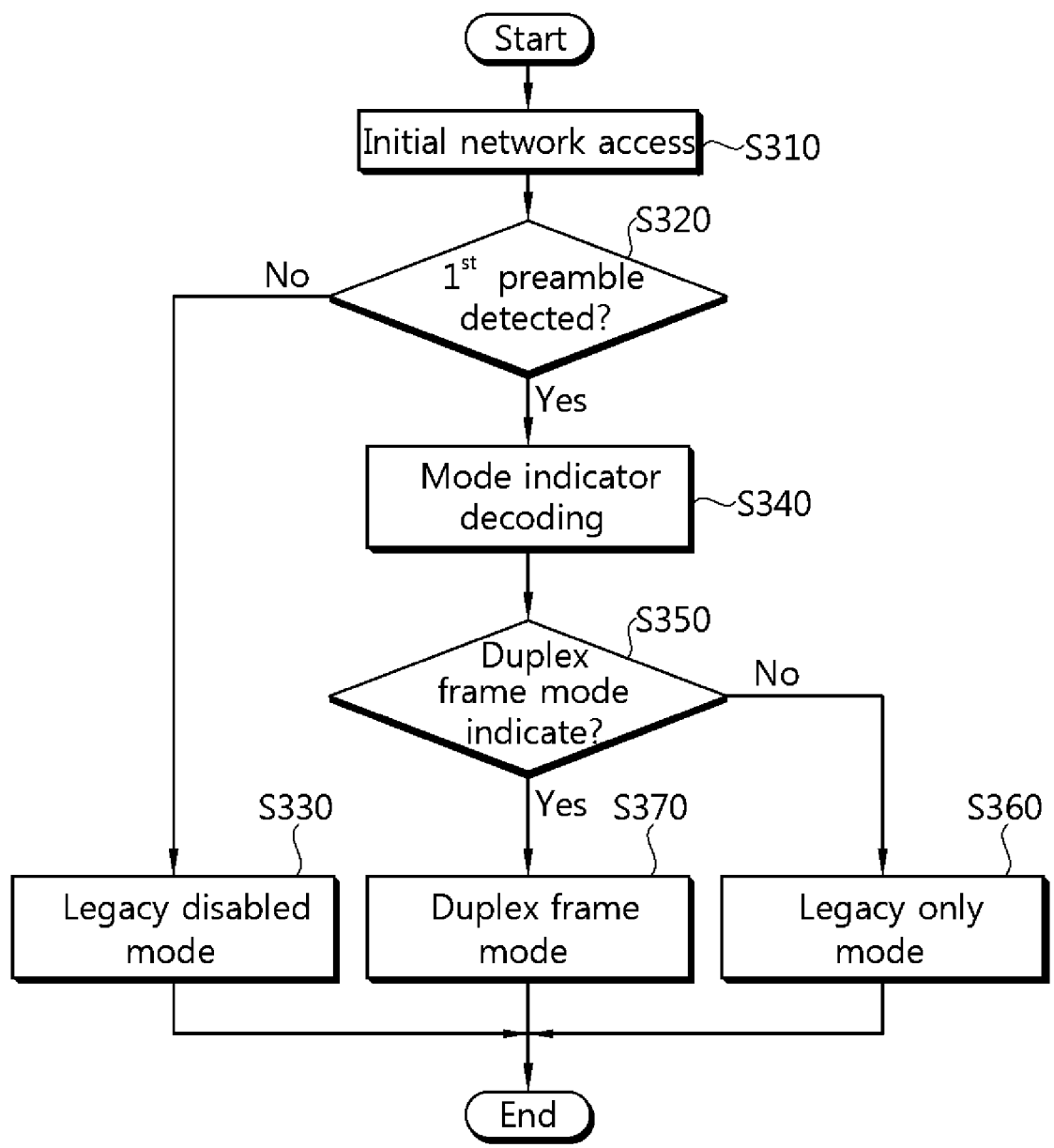
FIG. 16 is a flow chart illustrating a method for discriminating an operation mode of a base station by using a preamble and an FCH according to one embodiment of the present invention.

FIG. 16 is a flow chart illustrating a method for discriminating an operation mode of a base station by using a preamble and an FCH according to one embodiment of the present invention. The operation modes of the BS are discriminated by using the first preamble and the first FCH.

Referring to FIG. 16, the second UE enters a cell region of the BS and attempts an initial network access (S310). The second UE matches initial synchronization and receives a preamble to check an operation mode of the BS.

The second UE determines whether or not a first preamble is detected from a signal received from the BS (S320). If the first preamble is not detected, the second UE recognizes that the BS operates in the legacy disabled mode (S330) The second UE can use the service of the second system according to the operation scheme of the second system.

If the first preamble is detected, the second UE decodes the mode indicator of the first FCH (S340). The mode indicator of the first FCH may be included with the size of 1 bit in the reserved bits. Here, the mode indicator indicates whether or not the BS operates in the duplex frame mode. For example, if the value of the mode indicator is '0', it may mean that the BS does not operate in the duplex frame mode, and if the value of the mode indicator is '1', it may mean that the BS operates in the duplex frame mode.

The second UE determines whether or not the mode indicator indicates the duplex frame mode (S350) If the mode indicator does not indicate the duplex frame mode, the second UE recognizes that the BS operates in the legacy only mode (S360). The second UE may use the service of the first system according to the operation scheme of the first system.

If the mode indicator indicates the duplex frame mode, the second UE recognizes that the BS operates in the duplex frame mode (S370) The second UE may selectively use the service of the first system or the service of the second system.

Because the second UE discriminates the legacy disabled mode by using the first preamble, it is considered to have good backward compatibility considering the first system. However, because some control region of the first system should be used to discriminate the operation modes of the BS, it may not be flexible for designing the frame of the second system.

Figure 17:
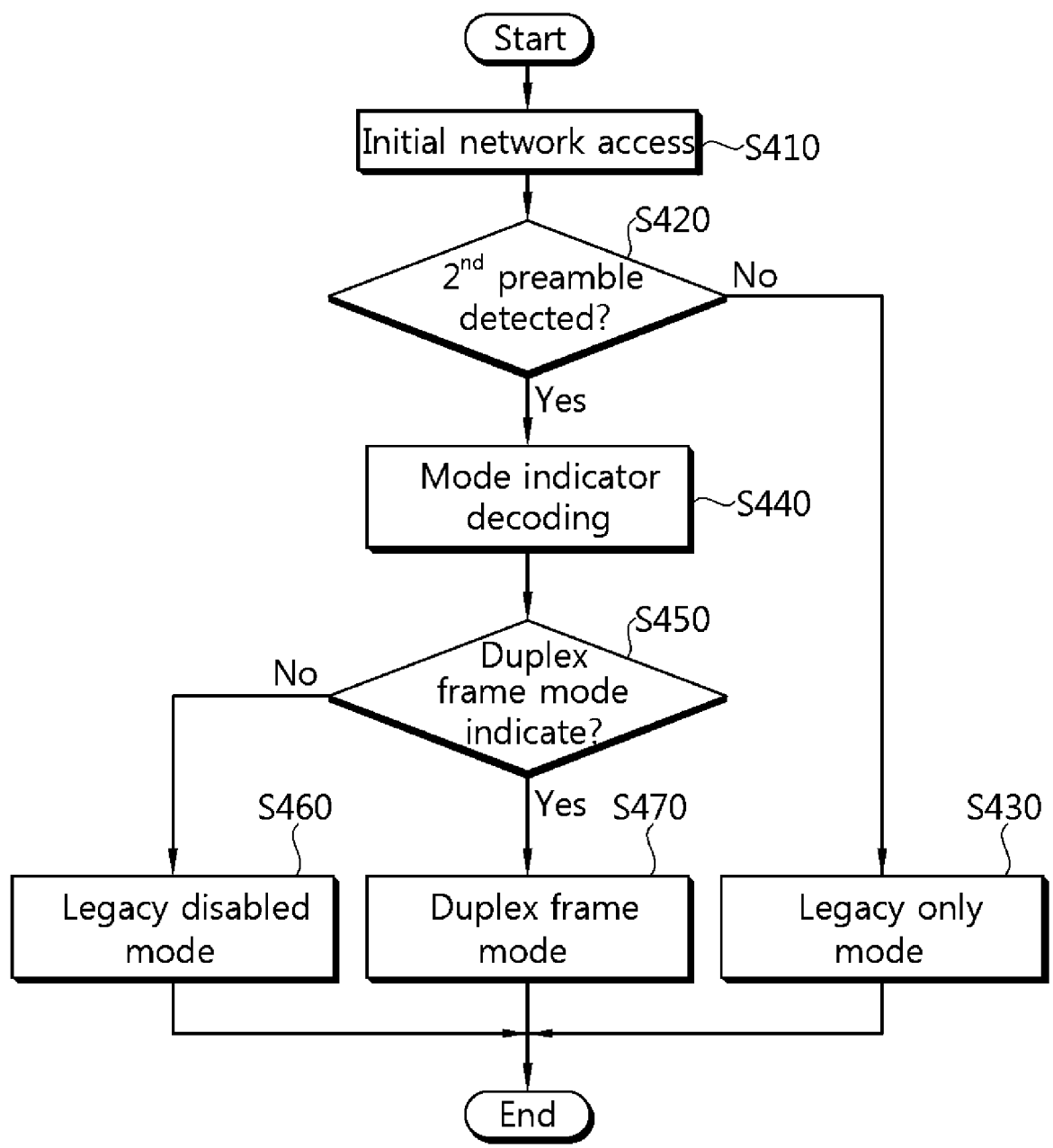
FIG. 17 is a flow chart illustrating a method for discriminating an operation mode of a base station by using a preamble and an FCH according to another embodiment of the present invention.

FIG. 17 is a flow chart illustrating a method for discriminating an operation mode of a base station by using a preamble and an FCH according to another embodiment of the present invention. Operation modes of the BS are discriminated by using a second preamble and a second FCH.

Referring to FIG. 17, the second UE enters a cell region of the BS and attempts an initial network access (S410). The second UE matches initial synchronization and receives a preamble to check an operation mode of the BS.

The second UE determines whether or not a second preamble is detected from a signal received from the BS (S420). If the second preamble is not detected, the second UE recognizes that the BS operates in the legacy only mode (S430). The second UE can use the service of the first system according to the operation scheme of the first system.

If the second preamble is detected, the second UE decodes a mode indicator of the second FCH. The second FCH may be allocated following the second preamble in the time domain, and includes information about the mode indicator and the second DL/UL MAP. The mode indicator indicates whether or not the BS operates in the duplex frame mode.

The second UE determines whether or not the mode indicator indicates the duplex frame mode (S450) If the mode indicator does not indicate the duplex frame mode, the second UE recognizes that the BS operates in the legacy disabled mode (S460). The second UE can use the service of the second system according to the operation scheme of the second system.

If the mode indicator indicates the duplex frame mode, the second UE recognizes that the BS operates in the duplex frame mode (S470). The second UE can selectively use the service of the first system or the service of the second system.

In this case, because the first UE cannot detect the second preamble, it cannot recognize the operation of the BS but know only whether or not the service of the first system is provided according to whether or not the first preamble is detected. Because the second UE uses the control region of the second system to discriminate the operation modes of the BS, the frame designing for the second system can be useful. The control region of the second system can be more effectively designed compared with the first system, and thus, the performance of the second system can be improved.

By providing services of a second system evolved enough to support backward compatibility with respect to services of a first system, the present invention can adaptively cope with a change in the rapidly developing communication technologies, and because an operation mode of a base station can be effectively informed in a duplex frame structure for the first and second systems, the second system can be more flexibly designed.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method of transmitting data in a wireless communication system, the method comprising:

receiving a preamble and a frame control header (FCH) for a first wireless communication system from a base station;

acquiring first information from the received FCH for a first downlink (DL)/uplink (UL) MAP of the first wireless communication system, the first information indicating a length and a coding scheme of the first DL/UL MAP;

acquiring second information from reserved bits of the received FCH for a second control region of a second wireless communication system, the second information indicating:

a presence of the second control region of the second wireless communication system; and a start point of a second frame; and communicating with the base station via the second frame for the second wireless communication system when the second information indicates the presence of the second control region, wherein the second frame is defined by the second control region, wherein a first frame for the first wireless communication system is defined by the first DL/UL MAP, wherein the second wireless communication system supports backward compatibility with the first wireless communication system, and wherein a bandwidth of the first wireless communication system is equal to a bandwidth of the second wireless communication system.

2. The method of claim 1, wherein the start point of the second frame is indicated by a unit of a subframe or a transmission time interval (TTI).

3. The method of claim 1, wherein the start point of the second frame is indicated by a unit of an orthogonal frequency division multiplexing (OFDM) symbol.

4. The method of claim 1, wherein a number of the reserved bits is 5.

5. The method of claim 1, wherein the second control region is located in the second frame.

6. The method of claim 1, wherein the second frame follows the first frame in a time domain.

7. The method of claim 1, wherein the first frame follows the second frame in a time domain.

* * * * *